(12) United States Patent
Nakamura et al.

(10) Patent No.: US 10,558,133 B2
(45) Date of Patent: Feb. 11, 2020

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Nobuhiro Nakamura, Numazu (JP); Tsutomu Nishida, Mishima (JP); Atsushi Okuda, Yokohama (JP); Yuka Ishiduka, Suntou-gun (JP); Hiroyuki Watanabe, Suntou-gun (JP); Hideharu Shimozawa, Numazu (JP); Kenichi Kaku, Suntou-gun (JP); Koichi Nakata, Tokyo (JP); Haruki Mori, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/423,429

(22) Filed: May 28, 2019

(65) Prior Publication Data
US 2019/0369516 A1    Dec. 5, 2019

(30) Foreign Application Priority Data

May 31, 2018 (JP) .................. 2018-105591

(51) Int. Cl.
*G03G 5/07* (2006.01)
*G03G 5/147* (2006.01)
*G03G 9/16* (2006.01)
*G03G 21/18* (2006.01)
*C08L 33/14* (2006.01)

(52) U.S. Cl.
CPC ......... *G03G 5/071* (2013.01); *G03G 5/14734* (2013.01); *G03G 5/14786* (2013.01); *G03G 9/16* (2013.01); *G03G 21/18* (2013.01); *C08L 33/14* (2013.01); *G03G 2221/183* (2013.01)

(58) Field of Classification Search
CPC ............... G03G 5/071; G03G 5/14717; G03G 5/14734; G03G 5/14786
USPC .................................................. 430/58.766
See application file for complete search history.

(56) References Cited

U.S. PATENT DOCUMENTS

| | | | |
|---|---|---|---|
| 6,991,881 B2 | 1/2006 | Ogaki et al. | |
| 6,994,941 B2 | 2/2006 | Tanaka et al. | |
| 7,001,699 B2 | 2/2006 | Tanaka et al. | |
| 7,045,261 B2 | 5/2006 | Tanaka et al. | |
| 7,186,489 B2 | 3/2007 | Uematsu et al. | |
| 7,226,711 B2 | 6/2007 | Amamiya et al. | |
| 7,534,534 B2 | 5/2009 | Nakata et al. | |
| 7,585,604 B2 | 9/2009 | Ogaki et al. | |
| 7,645,547 B2 | 1/2010 | Okuda et al. | |
| 7,655,370 B2 | 2/2010 | Kitamura et al. | |
| 7,910,274 B2 | 3/2011 | Tanaka et al. | |
| 7,927,774 B2 | 4/2011 | Ogaki et al. | |
| 8,088,541 B2 | 1/2012 | Tanaka et al. | |
| 8,455,170 B2 | 6/2013 | Nakamura et al. | |
| 8,481,236 B2 | 7/2013 | Tanaka et al. | |
| 8,524,433 B2 * | 9/2013 | Doi ........ | G03G 21/18 430/56 |
| 8,632,935 B2 | 1/2014 | Sugiyama et al. | |
| 8,669,027 B2 | 3/2014 | Anezaki et al. | |
| 8,753,789 B2 | 6/2014 | Ogaki et al. | |
| 8,765,335 B2 | 7/2014 | Tanaka et al. | |
| 8,783,209 B2 | 7/2014 | Kaku et al. | |
| 8,815,479 B2 | 8/2014 | Shida et al. | |
| 8,846,281 B2 | 9/2014 | Okuda et al. | |
| 8,865,381 B2 | 10/2014 | Tanaka et al. | |
| 8,921,020 B2 | 12/2014 | Murai et al. | |
| 8,980,508 B2 | 3/2015 | Okuda et al. | |
| 8,980,509 B2 | 3/2015 | Noguchi et al. | |
| 9,029,054 B2 | 5/2015 | Okuda et al. | |
| 9,040,214 B2 | 5/2015 | Fujii et al. | |
| 9,046,797 B2 | 6/2015 | Fujii et al. | |
| 9,063,505 B2 | 6/2015 | Sekiya et al. | |
| 9,069,267 B2 | 6/2015 | Kaku et al. | |
| 9,114,565 B2 | 8/2015 | Kawai et al. | |
| 9,170,506 B2 | 10/2015 | Tanaka et al. | |
| 9,170,507 B2 | 10/2015 | Sugiyama et al. | |
| 9,188,888 B2 | 11/2015 | Okuda et al. | |
| 9,207,550 B2 | 12/2015 | Okuda et al. | |
| 9,280,071 B2 | 3/2016 | Maruyama et al. | |
| 9,280,072 B2 | 3/2016 | Ogaki et al. | |
| 9,282,615 B2 | 3/2016 | Yamagishi et al. | |

(Continued)

FOREIGN PATENT DOCUMENTS

| | | |
|---|---|---|
| JP | 2005-062300 | 3/2005 |
| JP | 2015-225132 | 12/2015 |

OTHER PUBLICATIONS

U.S. Appl. No. 16/272,268, Hideharu Shimozawa, filed Feb. 11, 2019.

(Continued)

*Primary Examiner* — Janis L Dote
(74) *Attorney, Agent, or Firm* — Venable LLP

(57) ABSTRACT

An electrophotographic photosensitive member suppressing potential variation due to repeated use is provided. The electrophotographic photosensitive member is an electrophotographic photosensitive member including a support, a photosensitive layer and a protective layer in this order, wherein the protective layer contains: a resin including a structure represented by a general formula (1) and a structure represented by a general formula (2); and a compound represented by a general formula (3), the molar ratio of the proportion of the structure represented by the general formula (2) to the proportion of the structure represented by the general formula (1) in the resin is 0.0002 to 0.1000 in a molar ratio, and the molar ratio of the content of the compound represented by the general formula (3) to the content of the structure represented by the general formula (1) in the resin in the protective layer is 0.0002 to 0.1000 in a molar ratio.

11 Claims, 1 Drawing Sheet

(56) References Cited

U.S. PATENT DOCUMENTS

| | | |
|---|---|---|
| 9,304,416 B2 | 4/2016 | Noguchi et al. |
| 9,316,931 B2 | 4/2016 | Takagi et al. |
| 9,341,964 B2 | 5/2016 | Ogaki et al. |
| 9,372,417 B2 | 6/2016 | Fujii et al. |
| 9,372,418 B2 | 6/2016 | Shida et al. |
| 9,372,419 B2 | 6/2016 | Tsuji et al. |
| 9,389,523 B2 | 7/2016 | Nakata et al. |
| 9,436,106 B2 | 9/2016 | Kuno et al. |
| 9,436,107 B2 | 9/2016 | Murakami et al. |
| 9,459,545 B2 | 10/2016 | Tanaka et al. |
| 9,523,929 B2 | 12/2016 | Nakamura et al. |
| 9,535,346 B2 | 1/2017 | Sekiya et al. |
| 9,541,850 B2 | 1/2017 | Nishida et al. |
| 9,563,139 B2 | 2/2017 | Kawahara et al. |
| 9,575,422 B2 | 2/2017 | Okuda et al. |
| 9,594,318 B2 | 3/2017 | Nakata et al. |
| 9,599,915 B2 | 3/2017 | Anezaki et al. |
| 9,599,917 B2 | 3/2017 | Okuda et al. |
| 9,645,515 B2 | 5/2017 | Kuno et al. |
| 9,645,516 B2 | 5/2017 | Kawahara et al. |
| 9,684,277 B2 | 6/2017 | Yamamoto et al. |
| 9,726,992 B2 | 8/2017 | Sakuma et al. |
| 9,740,117 B2 | 8/2017 | Kosaka et al. |
| 9,772,596 B2 | 9/2017 | Mitsui et al. |
| 9,791,792 B2 | 10/2017 | Miyauchi et al. |
| 9,869,032 B2 | 1/2018 | Kawahara et al. |
| 10,042,272 B2 | 8/2018 | Mori et al. |
| 10,073,362 B2 | 9/2018 | Fujii et al. |
| 10,120,331 B2 | 11/2018 | Nakata et al. |
| 10,162,278 B2 | 12/2018 | Kuno et al. |
| 10,203,617 B2 | 2/2019 | Kuno et al. |
| 10,303,085 B2 | 5/2019 | Sato et al. |
| 10,310,395 B2 | 6/2019 | Nakata et al. |
| 2004/0248024 A1 | 12/2004 | Suzuki et al. |
| 2005/0221210 A1 | 10/2005 | Suzuki et al. |
| 2014/0004450 A1 | 1/2014 | Tokimitsu et al. |
| 2014/0093281 A1 | 4/2014 | Takahashi et al. |
| 2015/0185630 A1 | 7/2015 | Ito et al. |
| 2015/0185634 A1 | 7/2015 | Sekiya et al. |
| 2015/0316863 A1 | 11/2015 | Tanaka et al. |
| 2015/0346617 A1 | 12/2015 | Kawahara et al. |
| 2015/0362847 A1 | 12/2015 | Tanaka et al. |
| 2016/0091807 A1 | 3/2016 | Tanaka et al. |
| 2016/0131985 A1 | 5/2016 | Tanaka et al. |
| 2017/0060008 A1 | 3/2017 | Okuda et al. |
| 2018/0059558 A1 | 3/2018 | Ito et al. |
| 2018/0329317 A1 | 11/2018 | Mori et al. |
| 2018/0335708 A1 | 11/2018 | Nakata et al. |
| 2018/0341190 A1 | 11/2018 | Nishi et al. |
| 2019/0049867 A1 | 2/2019 | Tokimitsu et al. |
| 2019/0056676 A1 | 2/2019 | Nakata et al. |
| 2019/0094726 A1 | 3/2019 | Mori et al. |

OTHER PUBLICATIONS

U.S. Appl. No. 16/286,762, Nobuhiro Nakamura, filed Feb. 27, 2019.
U.S. Appl. No. 16/287,102, Tsutomu Nishida, filed Feb. 27, 2019.
U.S. Appl. No. 16/416,929, Haruki Mori, filed May 20, 2019.
U.S. Appl. No. 16/423,292, Yasutaka Yagi, filed May 28, 2019.
U.S. Appl. No. 16/430,860, Koichi Nakata, filed Jun. 4, 2019.
U.S. Appl. No. 16/423,326, Hiroyuki Watanabe, filed May 28, 2019.
U.S. Appl. No. 16/423,337, Yuka Ishiduka, filed May 28, 2019.
U.S. Appl. No. 16/423,381, Atsushi Okuda, filed May 28, 2019.
U.S. Appl. No. 16/423,393, Tsutomu Nishida, filed May 28, 2019.
U.S. Appl. No. 16/423,418, Hiroyuki Watanabe, filed May 28, 2019.

* cited by examiner

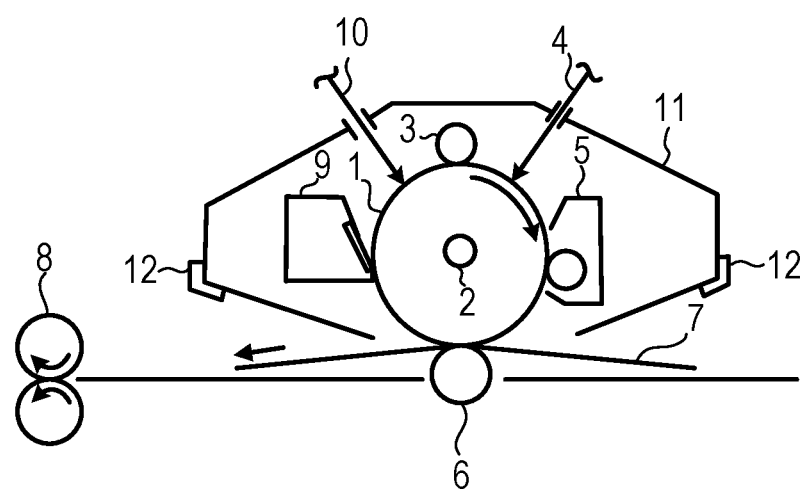

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present disclosure relates to an electrophotographic photosensitive member, and a process cartridge and an electrophotographic apparatus each including the electrophotographic photosensitive member.

Description of the Related Art

Electrophotographic photosensitive members containing an organic photoconductive material (charge generation material) are used as electrophotographic photosensitive members to be installed in process cartridges and electrophotographic apparatuses. Electrophotographic apparatuses with longer life time have been required in recent years, and hence it is demanded to provide an electrophotographic photosensitive member improved in terms of image quality and abrasion resistance (mechanical durability) and being capable of suppressing potential variation.

For methods of improving abrasion resistance of electrophotographic photosensitive members (hereinafter, also referred to as "photosensitive members", simply), using radical-polymerizable resin for the surface of a photosensitive member have been examined to improve abrasion resistance. However, image deletion sometimes occurs as an adverse effect of the improved abrasion resistance. Image deletion is a phenomenon where a blurred electrostatic latent image is formed on the surface of a photosensitive member to result in a blurred output image. To solve the problem, examinations have been made on use of a compound having one radical-polymerizable functional group for the surface of a photosensitive member.

Japanese Patent Application Laid-Open No. 2015-225132 describes a technique to improve scratch resistance and reduce image deletion through inclusion of a polymerization product of a triarylamine compound having one acryloyloxy group or methacryloyloxy group. Japanese Patent Application Laid-Open No. 2005-062300 describes a technique to reduce image deletion through inclusion of a polymerization product of a charge-transporting compound having an acryloyloxy group and a compound having a hydroxy group in a surface layer.

SUMMARY OF THE INVENTION

Examination made by the present inventors has revealed that as for the electrophotographic photosensitive members described in Japanese Patent Application Laid-Open Nos. 2015-225132 and 2005-062300, there is room for improvement in terms of potential variation of the photosensitive members due to repeated use.

Accordingly, an object of the present disclosure is to provide an electrophotographic photosensitive member suppressing potential variation due to repeated use.

The object is achieved by the following present disclosure. Specifically, the electrophotographic photosensitive member according to the present disclosure is an electrophotographic photosensitive member including a support, a photosensitive layer and a protective layer in this order, wherein the protective layer contains: a resin including a structure represented by a general formula (1) below and a structure represented by a general formula (2) below; and a compound represented by a general formula (3) below, the molar ratio of the proportion of the structure represented by the general formula (2) to the proportion of the structure represented by the general formula (1) in the resin is 0.0002 or more and 0.1000 or less, and the molar ratio of the content of the compound represented by the general formula (3) to the content of the structure represented by the general formula (1) in the resin in the protective layer is 0.0002 or more and 0.1000 or less:

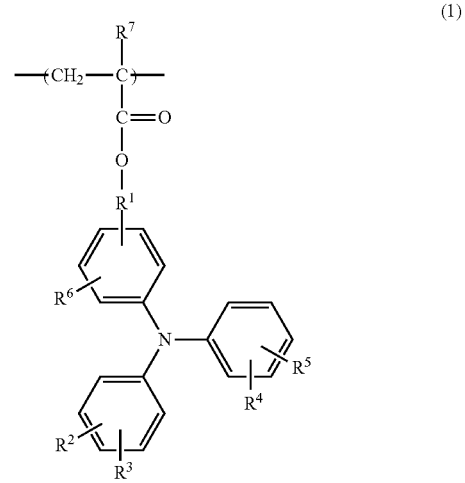

(1)

wherein $R^1$ is a substituted or unsubstituted alkylene group or a substituted or unsubstituted phenylene group; and $R^2$ to $R^7$ are each independently a hydrogen atom, a methyl group or an ethyl group,

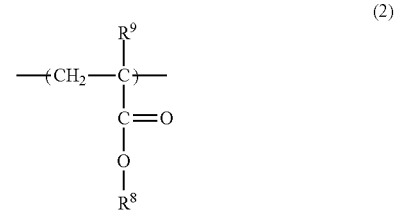

(2)

wherein $R^8$ is a hydrogen atom or a substituted or unsubstituted alkyl group having one to three carbon atoms; and $R^9$ is a hydrogen atom, a methyl group or an ethyl group,

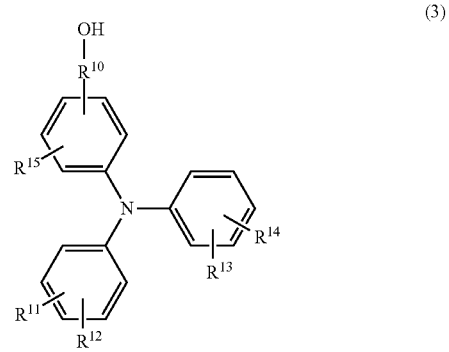

(3)

wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.

According to the present disclosure, there is provided an electrophotographic photosensitive member suppressing potential variation due to repeated use.

Further features of the present disclosure will become apparent from the following description of exemplary embodiments with reference to the attached drawing.

BRIEF DESCRIPTION OF THE DRAWINGS

FIGURE illustrates an example of the schematic configuration of an electrophotographic apparatus including a process cartridge including an electrophotographic photosensitive member.

DESCRIPTION OF THE EMBODIMENTS

Preferred embodiments of the present disclosure will now be described in detail in accordance with the accompanying drawing.

The present disclosure relates to an electrophotographic photosensitive member including a support, a photosensitive layer and a protective layer in this order, wherein the protective layer contains: a resin including a structure represented by a general formula (1) below and a structure represented by a general formula (2) below; and a compound represented by a general formula (3) below, the molar ratio of the proportion of the structure represented by the general formula (2) to the proportion of the structure represented by the general formula (1) in the resin is 0.0002 or more and 0.1000 or less, and the molar ratio of the content of the compound represented by the general formula (3) to the content of the structure represented by the general formula (1) in the resin in the protective layer is 0.0002 or more and 0.1000 or less:

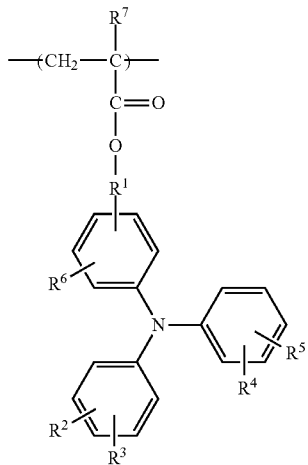

(1)

wherein $R^1$ is a substituted or unsubstituted alkylene group or a substituted or unsubstituted phenylene group; and $R^2$ to $R^7$ are each independently a hydrogen atom, a methyl group or an ethyl group,

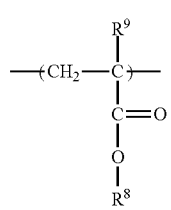

(2)

wherein $R^8$ is a hydrogen atom or a substituted or unsubstituted alkyl group having one to three carbon atoms; and $R^9$ is a hydrogen atom, a methyl group or an ethyl group,

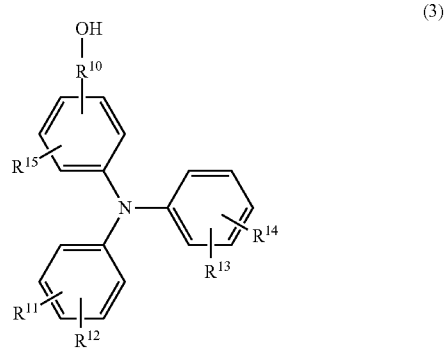

(3)

wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.

The present disclosure further relates to an electrophotographic photosensitive member including: a photosensitive layer and a protective layer in this order above a support, wherein the protective layer is a film obtained by curing a coating solution for protective layers, the coating solution for protective layers contains: a solvent; a resin including a structure represented by a general formula (1-A) below and a structure represented by a general formula (2-A) below; and a compound represented by a general formula (3) below, the molar ratio of the proportion of the structure represented by the general formula (2-A) to the proportion of the structure represented by the general formula (1-A) in the resin is 0.0002 or more and 0.1000 or less, and the molar ratio of the content of the compound represented by the general formula (3) to the content of the structure represented by the general formula (1-A) in the resin in the protective layer is 0.0002 or more and 0.1000 or less:

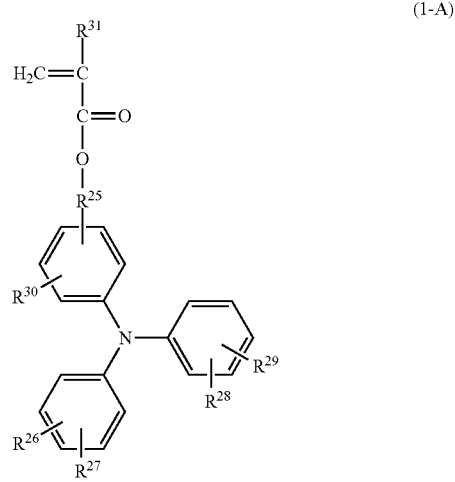

(1-A)

wherein $R^{25}$ is a substituted or unsubstituted alkylene group or a substituted or unsubstituted phenylene group; and $R^{26}$ to $R^{31}$ are each independently a hydrogen atom, a methyl group or an ethyl group,

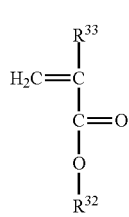

(2-A)

wherein $R^{32}$ is a hydrogen atom or a substituted or unsubstituted alkyl group having one to three carbon atoms; and $R^{33}$ is a hydrogen atom, a methyl group or an ethyl group,

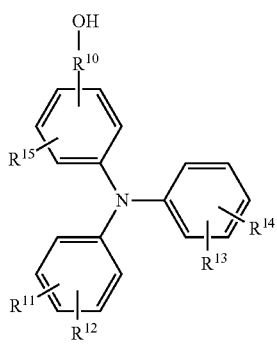

(3)

wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.

The present inventors infer the reason for the superiority of the photosensitive member of the present disclosure in suppression of potential variation as follows.

First, we will describe conventional techniques. When abrasion resistance is improved through inclusion of a polymerization product obtained by polymerizing a charge transport material having a chain-polymerizable functional group, the charge transport of the photosensitive member is sometimes adversely affected. This is presumably because charge-transporting frameworks are involved in polymerization to restrict the arrangement of charge-transporting frameworks, which is likely to cause biased distribution of charge-transporting frameworks. Hence, repeated light exposure for charging during repeated use results in stagnation of charge transport, leading to larger potential variation.

In the present disclosure, the protective layer contains: a resin including a structure represented by the general formula (1) and a structure represented by the general formula (2); and a compound represented by the general formula (3).

The resin including the structure represented by the general formula (1) has a structure in which charge-transporting frameworks hang down from the main chain. For this reason, the abundance of the charge-transporting material is relatively less near the main chain. Since no charge-transporting framework is present in the main chain in the structure represented by the general formula (1), the three-dimensional arrangement of charge-transporting frameworks is relatively flexible. The presence of the structure represented by the general formula (2) together with the structure represented by the general formula (1) enables further flexible three-dimensional arrangement of charge-transporting frameworks, which facilitates formation of a space near the main chain molecule to allow the charge-transporting compound represented by the general formula (3) to be incorporated therein. In addition, the interaction between the carbonyl group in the structure represented by the general formula (1) or the structure represented by the general formula (2) and the hydroxy group in the charge-transporting compound represented by the general formula (3) facilitates incorporation of the charge-transporting compound represented by the general formula (3) in the space. In this way, the distribution of charge-transporting frameworks becomes homogeneous and smooth charge transport is achieved, and thus potential variation can be suppressed.

Examples of the substituent of $R^1$ in the general formula (1) include a methyl group and an ethyl group. Preferred examples of the structure represented by the general formula (1) are illustrated in (1-1) to (1-7).

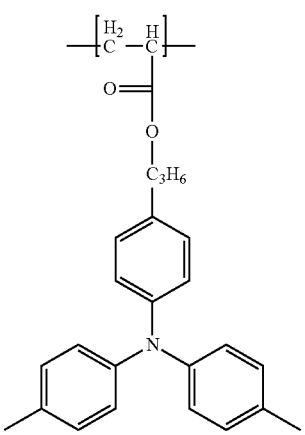

(1-1)

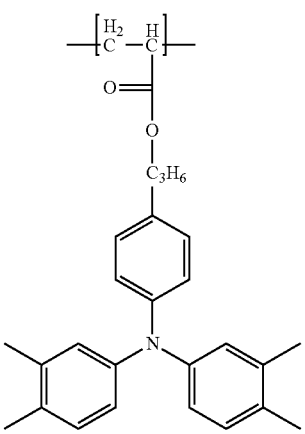

(1-2)

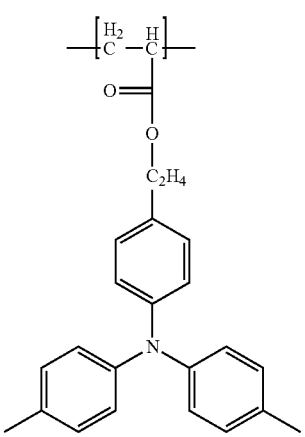

(1-3)

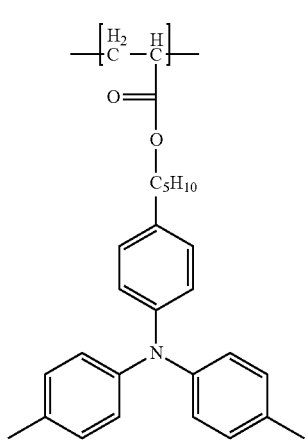 (1-4)

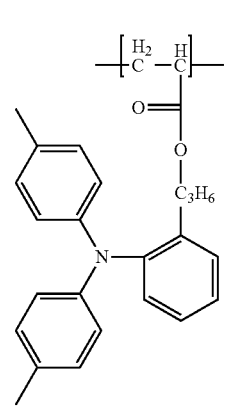 (1-7)

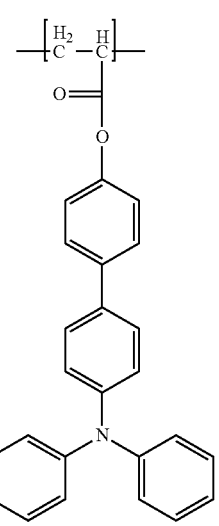 (1-5)

Examples of the substituent of $R^8$ in the general formula (2) include a methyl group and an ethyl group. Preferred examples of the structure represented by the general formula (2) are illustrated in (2-1) to (2-3).

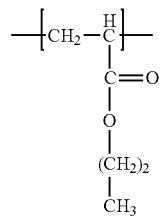 (2-1)

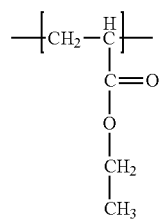 (2-2)

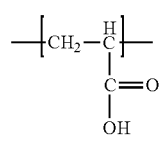 (2-3)

Examples of the substituent of $R^{10}$ in the general formula (3) include a methyl group and an ethyl group. Preferred examples of the structure represented by the general formula (3) are illustrated in (3-1) to (3-6).

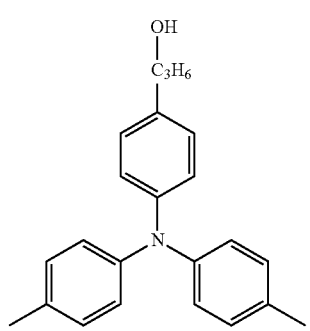 (3-1)

(1-6)

(3-2)
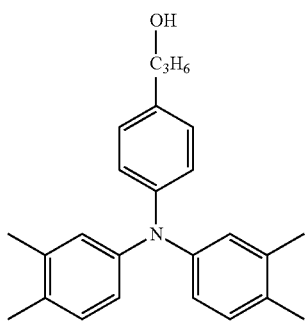

(3-3)
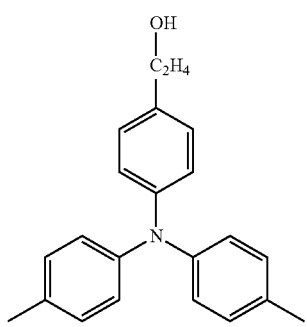

(3-4)
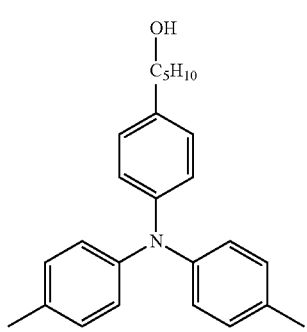

(3-5)
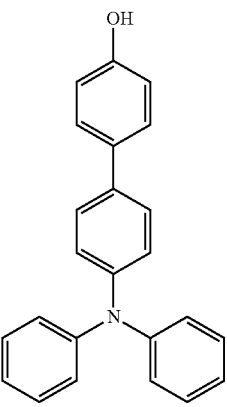

(3-6)
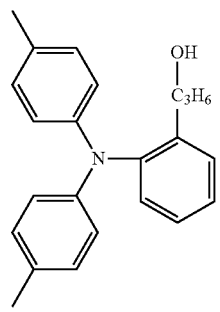

Preferably, the resin in the protective layer further includes a structure represented by a general formula (4) below. The resin including the structure represented by the general formula (4) can provide good durability:

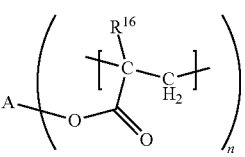

(4)

wherein A is an organic group; $R^{16}$ is a hydrogen atom, a methyl group or an ethyl group; and n is an integer of 2 or more and 6 or less.

Preferred examples of the structure represented by the general formula (4) are illustrated in (4-1) to (4-6).

(4-1)
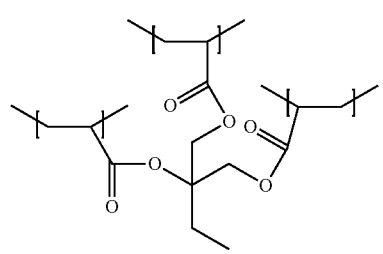

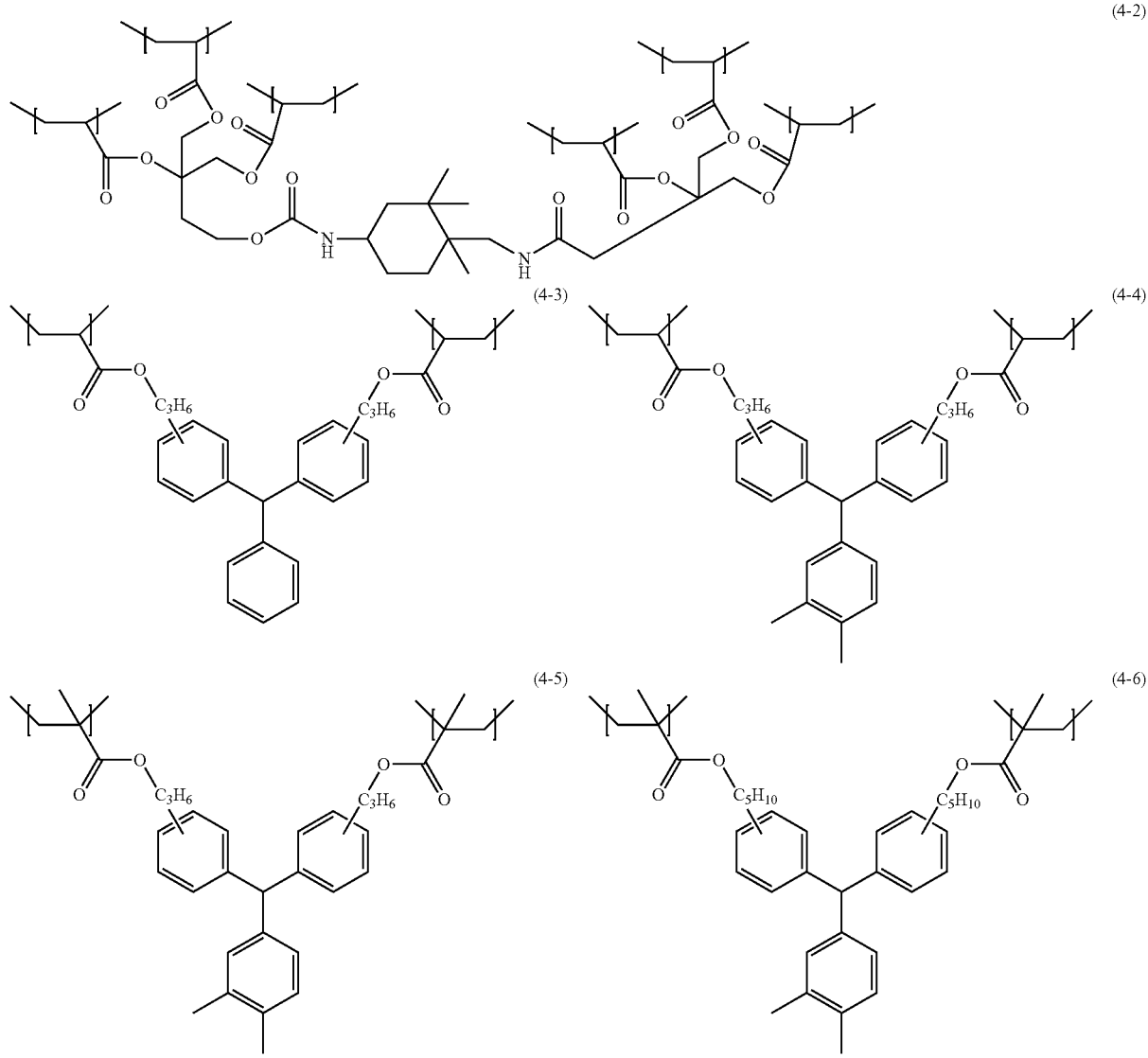

Among the structures, a structure represented by a general formula (5) below is preferred, and preferred examples thereof are illustrated in (4-3), (4-4), (4-5) and (4-6):

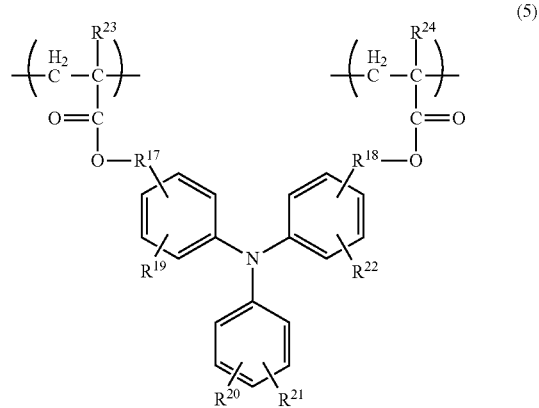

wherein $R^{17}$ and $R^{18}$ are a substituted or unsubstituted alkylene group; and $R^{19}$ to $R^{24}$ are each a hydrogen atom or a methyl group.

It is preferable that $R^1$ in the general formula (1) and $R^{10}$ in the general formula (3) be each an alkylene group having two or more and five or less carbon atoms, because this configuration facilitates incorporation of the compound represented by the general formula (3) in the space.

$R^8$ in the general formula (2) is a hydrogen atom or a substituted or unsubstituted alkyl group having one to three carbon atoms. This configuration facilitates formation of a space to incorporate the compound represented by the general formula (3) therein, and thus incorporation of the compound represented by the general formula (3) in the space. $R^8$ is preferably a hydrogen atom, because the interaction between the structure represented by the general formula (2) and the hydroxy group in the compound represented by the general formula (3) facilitates incorporation of the compound represented by the general formula (3) in the space.

The molar ratio of the proportion of the structure represented by the general formula (2) to the proportion of the structure represented by the general formula (1) in the resin is required to be 0.0002 or more and 0.1000 or less. If the molar ratio of the structure represented by the general formula (2) is more than 0.1000, lack of charge transport ability is caused over a larger portion, and likely to lead to failure in homogeneous charge transport.

The molar ratio of the content of the compound represented by the general formula (3) to the content of the structure represented by the general formula (1) in the resin in the protective layer is required to be 0.0002 or more and 0.1000 or less. If the molar ratio of the compound represented by the general formula (3) is 0.1000 or less, the aggregation of molecules of the compound represented by the general formula (3) can be prevented, and thus homogeneous charge transport is likely to be achieved.

The molar ratio of the proportion of the structure represented by the general formula (2) to the proportion of the structure represented by the general formula (1) in the resin is preferably 0.0002 or more and 0.0800 or less, and more preferably 0.0002 or more and 0.0600 or less. Molar ratios of the structure represented by the general formula (2) within this range are preferred because the aggregation of molecules of the same component is less likely to occur to facilitate homogenization of charge-transporting frameworks.

The molar ratio of the content of the compound represented by the general formula (3) to the content of the structure represented by the general formula (1) in the resin in the protective layer is preferably 0.0002 or more and 0.0800 or less, and more preferably 0.0002 or more and 0.0600 or less. Molar ratios of the compound represented by the general formula (3) within this range are preferred because the aggregation of molecules of the same component is less likely to occur to facilitate homogenization of charge-transporting frameworks.

The molar ratio of the content of the structure represented by the general formula (2) in the resin to the content of the compound represented by the general formula (3) in the protective layer is preferably 0.9 or more and 3.0 or less. In the case that the protective layer does not include the structure represented by the general formula (4), the molar ratio is more preferably 0.9 or more and 2.0 or less. In the case that the protective layer includes the structure represented by the general formula (4), the molar ratio is more preferably 1.5 or more and 3.0 or less. Molar ratios within such a range are preferred because the space formed by the structure represented by the general formula (2) and the structure represented by the general formula (3) are well-balanced in number, which facilitates incorporation of the structure represented by the general formula (3) in the space, without causing the aggregation of molecules of the same component.

To suppress potential variation, the content of the general formula (1) is preferably 20% by mass or more based on the total mass of the protective layer.

The structure of the protective layer in the electrophotographic photosensitive member according to the present disclosure can be analyzed by using a common analysis technique. For example, the structure can be confirmed by measurement methods including solid $^{13}$C-NMR analysis, mass spectrometry, pyrolysis GCMS and measurement of characteristic absorption with infrared spectrometry.

Due to the mechanisms described above, the constituents in the protective layer in the electrophotographic photosensitive member exert synergistic effects on each other, which enables achievement of the advantageous effects of the present disclosure.

[Electrophotographic Photosensitive Member]

The electrophotographic photosensitive member of the present disclosure includes a support, a photosensitive layer and a protective layer.

Examples of methods for producing the electrophotographic photosensitive member of the present disclosure include a method involving preparing coating solutions for different layers, which will be described later, applying the coating solutions in a desired order of layers, and drying the resultant. Examples of methods for applying each coating solution in this case include dip coating, spray coating, inkjet coating, roll coating, die coating, blade coating, curtain coating, wire-bar coating and ring coating. Among the methods, dip coating is preferred for efficiency and productivity.

Now, each layer will be described.

<Support>

In the present disclosure, the electrophotographic photosensitive member includes a support. The support is preferably an electroconductive support, which has electroconductivity, in the present disclosure. Examples of the shape of the support include a cylinder, a belt and a sheet. Especially, cylindrical supports are preferred. In addition, the surface of the support may be subjected to electrochemical treatment such as anodic oxidation, blasting, cutting, and so forth.

Metal, resin, glass, and so forth are preferred for the material of the support.

Examples of the metal include, aluminum, iron, nickel, copper, gold, stainless steel and alloys of these metals. Especially, the support is preferably an aluminum support using aluminum.

Electroconductivity may be imparted to the resin and glass by treatment such as mixing or covering with an electroconductive material.

<Electroconductive Layer>

In the present disclosure, an electroconductive layer may be provided on the support. By providing an electroconductive layer, scratches or unevenness in the surface of the support can be hidden, and light reflection on the surface of the support can be controlled.

The electroconductive layer preferably contains an electroconductive particle and a resin.

Examples of the material of the electroconductive particle include metal oxide, metal and carbon black.

Examples of the metal oxide include zinc oxide, aluminum oxide, indium oxide, silicon oxide, zirconium oxide, tin oxide, titanium oxide, magnesium oxide, antimony oxide and bismuth oxide. Examples of the metal include aluminum, nickel, iron, nichrome, copper, zinc and silver.

Among the materials, use of metal oxide for the electroconductive particle is preferred, and, in particular, use of titanium oxide, tin oxide or zinc oxide is more preferred.

In the case that metal oxide is used for the electroconductive particle, the surface of the metal oxide may be treated with a silane coupling agent or the like, or the metal oxide may be doped with an element of phosphorus, aluminum or the like, or an oxide thereof.

The electroconductive particle may have a laminate configuration including a core particle and a covering layer covering the core particle. Examples of the core particle include core particles of titanium oxide, barium sulfate or zinc oxide. Examples of the covering layer include covering layers of metal oxide such as tin oxide.

In the case that metal oxide is used for the electroconductive particle, the volume-average particle diameter is preferably 1 nm or larger and 500 nm or smaller, and more preferably 3 nm or larger and 400 nm or smaller.

Examples of the resin include polyester resin, polycarbonate resin, polyvinylacetal resin, acrylic resin, silicone resin, epoxy resin, melamine resin, polyurethane resin, phenolic resin and alkyd resin.

The electroconductive layer may further contain a masking agent such as silicone oil, resin particles and titanium oxide.

The average thickness of the electroconductive layer is preferably 1 µm or larger and 50 µm or smaller, and particularly preferably 3 µm or larger and 40 µm or smaller.

To form the electroconductive layer, a coating solution for electroconductive layers containing the above materials and a solvent is prepared, and a coating film of the coating solution is formed and dried. Examples of the solvent for the coating solution include alcohol solvent, sulfoxide solvent, ketone solvent, ether solvent, ester solvent and aromatic hydrocarbon solvent. Examples of methods for dispersing the electroconductive particle in the coating solution for electroconductive layers include methods using a paint shaker, a sand mill, a ball mill and a liquid-impinging high-speed disperser.

<Undercoat Layer>

In the present disclosure, an undercoat layer may be provided on the support or on the electroconductive layer. By providing an undercoat layer, interlayer adhesion function is enhanced, and charge injection-inhibiting function can be imparted.

The undercoat layer preferably contains a resin. Alternatively, the undercoat layer may be formed as a cured film by polymerizing a composition containing a monomer having a polymerizable functional group.

Examples of the resin include polyester resin, polycarbonate resin, polyvinylacetal resin, acrylic resin, epoxy resin, melamine resin, polyurethane resin, phenolic resin, polyvinylphenolic resin, alkyd resin, polyvinyl alcohol resin, polyethylene oxide resin, polypropylene oxide resin, polyamide resin, polyamide acid resin, polyimide resin, polyamideimide resin and cellulose resin.

Examples of the polymerizable functional group possessed by the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic anhydride group and a carbon-carbon double bond group.

The undercoat layer may further contain an electron transport material, metal oxide, metal, electroconductive polymer or the like, for the purpose of enhancing electric properties. Among the materials, use of an electron transport material or metal oxide is preferred.

Examples of the electron transport material include quinone compounds, imide compounds, benzimidazole compounds, cyclopentadienylidene compounds, fluorenone compounds, xanthone compounds, benzophenone compounds, cyanovinyl compounds, halogenated aryl compounds, silole compounds and fluorine-containing compounds. The undercoat layer may be formed as a cured film by using an electron transport material having a polymerizable functional group as the electron transport material to copolymerize with the above-described monomer having a polymerizable functional group.

Examples of the metal oxide include indium tin oxide, tin oxide, indium oxide, titanium oxide, zinc oxide, aluminum oxide and silicon dioxide. Examples of the metal include gold, silver and aluminum.

The undercoat layer may further contain an additive.

The average thickness of the undercoat layer is preferably 0.1 µm or larger and 50 µm or smaller, more preferably 0.2 µm or larger and 40 µm or smaller, and particularly preferably 0.3 µm or larger and 30 µm or smaller.

To form the undercoat layer, a coating solution for undercoat layers containing the above materials and a solvent is prepared, and a coating film of the coating solution is formed, and dried and/or cured. Examples of the solvent for the coating solution include alcohol solvent, ketone solvent, ether solvent, ester solvent and aromatic hydrocarbon solvent.

<Photosensitive Layer>

Photosensitive layers for electrophotographic photosensitive members are roughly classified into (1) laminated photosensitive layers and (2) single photosensitive layers. (1) Laminated photosensitive layers include a charge generation layer containing a charge generation material and a charge transport layer containing a charge transport material. (2) Single photosensitive layers include a photosensitive layer containing both a charge generation material and a charge transport material.

(1) Laminated Photosensitive Layer

Laminated photosensitive layers include a charge generation layer and a charge transport layer.

(1-1) Charge Generation Layer

The charge generation layer preferably contains a charge generation material and a resin.

Examples of the charge generation material include azo pigments, perylene pigments, polycyclic quinone pigments, indigo pigments and phthalocyanine pigments. Among them, azo pigments and phthalocyanine pigments are preferred. Among phthalocyanine pigments, oxytitanium phthalocyanine pigments, chlorogallium phthalocyanine pigments and hydroxygallium phthalocyanine pigments are preferred.

The content of the charge generation material in the charge generation layer is preferably 40% by mass or more and 85% by mass or less, and more preferably 60% by mass or more and 80% by mass or less, based on the total mass of the charge generation layer.

Examples of the resin include polyester resin, polycarbonate resin, polyvinylacetal resin, polyvinylbutyral resin, acrylic resin, silicone resin, epoxy resin, melamine resin, polyurethane resin, phenolic resin, polyvinyl alcohol resin, cellulose resin, polystyrene resin, polyvinyl acetate resin and polyvinyl chloride resin. Among the resins, polyvinylbutyral resin is more preferred.

The charge generation layer may further contain an additive such as an antioxidant and an ultraviolet absorber. Specific examples of the additive include hindered phenol compounds, hindered amine compounds, sulfur compounds, phosphorus compounds and benzophenone compounds.

The average thickness of the charge generation layer is preferably 0.1 µm or larger and 1 µm or smaller, and more preferably 0.15 µm or larger and 0.4 µm or smaller.

To form the charge generation layer, a coating solution for charge generation layers containing the above materials and a solvent is prepared, and a coating film of the coating solution is formed, and dried. Examples of the solvent for the coating solution include alcohol solvent, sulfoxide solvent, ketone solvent, ether solvent, ester solvent and aromatic hydrocarbon solvent.

(1-2) Charge Transport Layer

The charge transport layer preferably contains a charge transport material and a resin.

Examples of the charge transport material include polycyclic aromatic compounds, heterocyclic compounds, hydrazone compounds, styryl compounds, enamine compounds, benzidine compounds, triarylamine compounds and resins having a group derived from any of these substances. Among the charge transport materials, triarylamine compounds and benzidine compounds are preferred.

The content of the charge transport material in the charge transport layer is preferably 25% by mass or more and 70% by mass or less, and more preferably 30% by mass or more and 55% by mass or less, based on the total mass of the charge transport layer.

Examples of the resin include polyester resin, polycarbonate resin, acrylic resin and polystyrene resin. Among them, polycarbonate resin and polyester resin are preferred. In particular, polyarylate resin is preferred as the polyester resin.

The ratio (mass ratio) between the content of the charge transport material and the content of the resin is preferably 4:10 to 20:10, and more preferably 5:10 to 12:10.

The charge transport layer may further contain an additive such as an antioxidant, an ultraviolet absorber, a plasticizer, a leveling agent, a slipping agent and an abrasion resistance-improving agent. Specific examples of the additive include hindered phenol compounds, hindered amine compounds, sulfur compounds, phosphorus compounds, benzophenone compounds, siloxane-modified resin, silicone oil, fluororesin particles, polystyrene resin particles, polyethylene resin particles, silica particles, alumina particles and boron nitride particles.

The average thickness of the charge transport layer is preferably 5 μm or larger and 50 μm or smaller, more preferably 8 μm or larger and 40 μm or smaller, and particularly preferably 10 μm or larger and 30 μm or smaller.

To form the charge transport layer, a coating solution for charge transport layers containing the above materials and a solvent is prepared, and a coating film of the coating solution is formed, and dried. Examples of the solvent for the coating solution include alcohol solvent, ketone solvent, ether solvent, ester solvent and aromatic hydrocarbon solvent. Among the solvents, ether solvent and aromatic hydrocarbon solvent are preferred.

Preferred examples (compound examples) of the charge transport material are shown in the following.

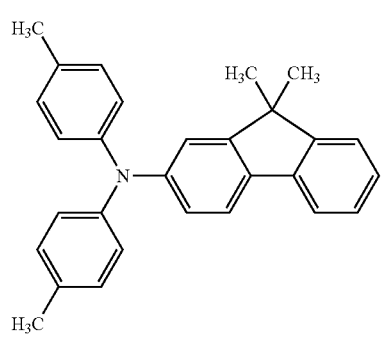

(CTM-1)

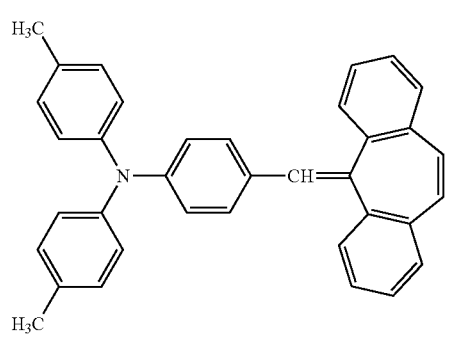

(CTM-2)

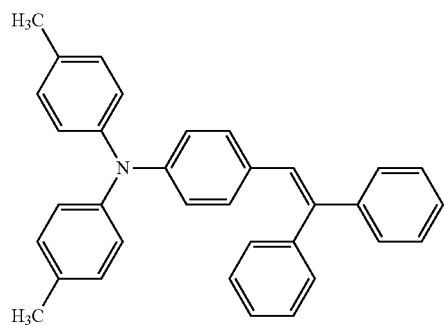

(CTM-3)

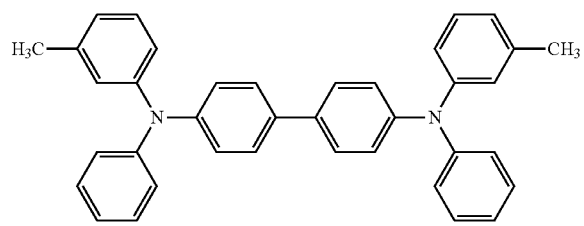

(CTM-4)

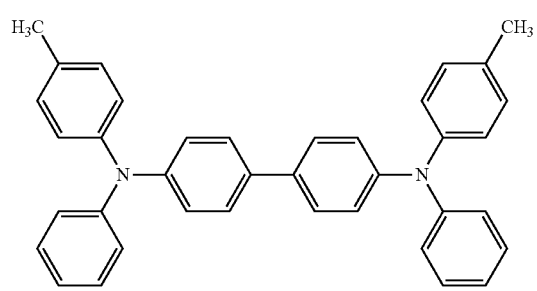

(CTM-5)

-continued
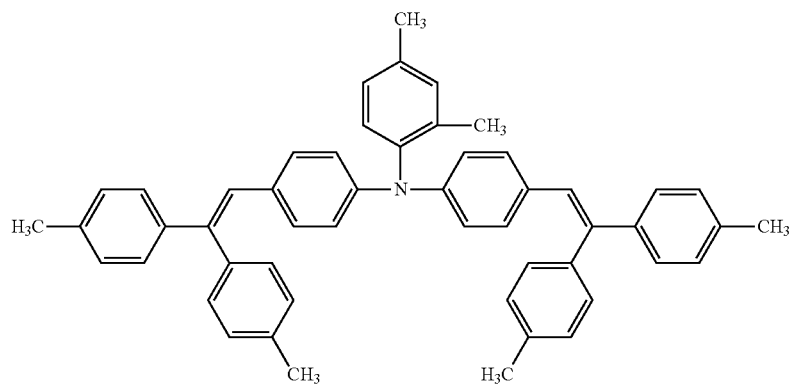
(CTM-6)
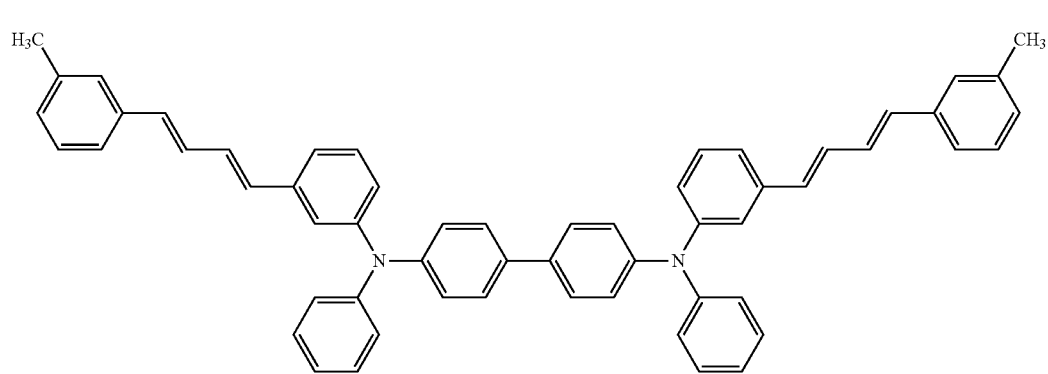
(CTM-7)
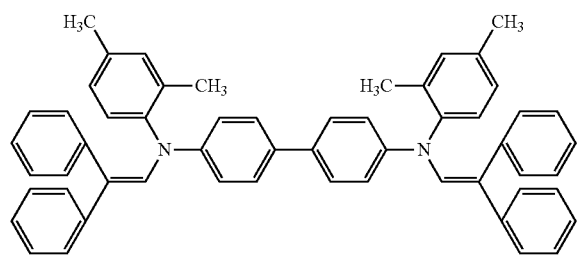
(CTM-8)
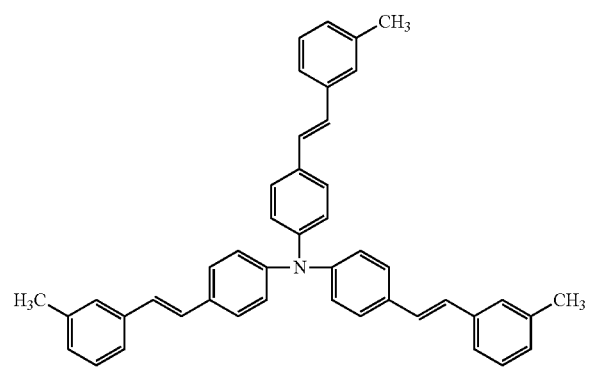
(CTM-9)
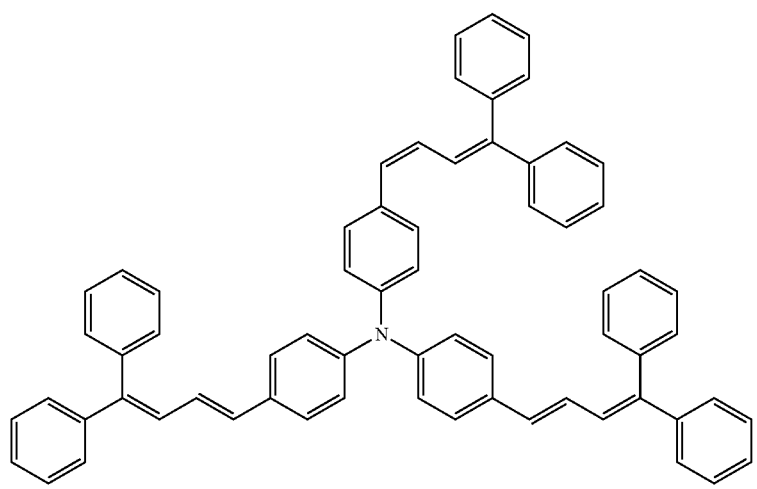
(CTM-10)

(2) Single Photosensitive Layer

To form a single photosensitive layer, a coating solution for photosensitive layers containing a charge generation material, a charge transport material, a resin and a solvent is prepared, and a coating film of the coating solution is formed, and dried. Examples of the charge generation material, the charge transport material and the resin are the same as the material examples in the above "(1) Laminated photosensitive layer".

<Protective Layer>

In the present disclosure, a protective layer is provided on the photosensitive layer.

As described hereinbefore, the protective layer contains: the resin including the structure represented by the general formula (1) and the structure represented by the general formula (2); and the compound represented by the general formula (3). The protective layer can be formed as a cured film by polymerizing a composition containing a monomer having a polymerizable functional group. Examples of the reaction in this case include thermal polymerization reaction, photopolymerization reaction and radiation-induced polymerization reaction. Examples of the polymerizable functional group possessed by the monomer having a polymerizable functional group include an acryloyl group and a methacryloyl group.

The protective layer may contain an additive such as an antioxidant, an ultraviolet absorber, a plasticizer, a leveling agent, a slipping agent and an abrasion resistance-improving agent. Specific examples of the additive include hindered phenol compounds, hindered amine compounds, sulfur compounds, phosphorus compounds, benzophenone compounds, siloxane-modified resin, silicone oil, fluororesin particles, polystyrene resin particles, polyethylene resin particles, silica particles, alumina particles and boron nitride particles.

The protective layer may contain an electroconductive particle and/or a charge transport material and a resin.

Examples of the electroconductive particle include particles of metal oxide such as titanium oxide, zinc oxide, tin oxide and indium oxide.

Examples of the charge transport material include polycyclic aromatic compounds, heterocyclic compounds, hydrazone compounds, styryl compounds, enamine compounds, benzidine compounds, triarylamine compounds and resins having a group derived from any of these substances. Among the charge transport materials, triarylamine compounds and benzidine compounds are preferred.

Examples of the resin include polyester resin, acrylic resin, phenoxy resin, polycarbonate resin, polystyrene resin, phenolic resin, melamine resin and epoxy resin. Among the resins, polycarbonate resin, polyester resin and acrylic resin are preferred.

The average thickness of the protective layer is preferably 0.5 μm or larger and 10 μm or smaller, and preferably 1 μm or larger and 7 μm or smaller.

To form the protective layer, a coating solution for protective layers containing the above materials and a solvent is prepared, and a coating film of the coating solution is formed, and dried and/or cured. Examples of the solvent for the coating solution include alcohol solvent, ketone solvent, ether solvent, sulfoxide solvent, ester solvent and aromatic hydrocarbon solvent.

[Process Cartridge, Electrophotographic Apparatus]

The process cartridge of the present disclosure includes and integrally supports the electrophotographic photosensitive member described hereinbefore and at least one unit selected from the group consisting of a charging unit, a developing unit, a transferring unit and a cleaning unit, and is attachable to and detachable from a main body of an electrophotographic apparatus.

The electrophotographic apparatus of the present disclosure includes the electrophotographic photosensitive member described hereinbefore, a charging unit, an exposure unit, a developing unit and a transferring unit.

FIGURE illustrates an example of the schematic configuration of an electrophotographic apparatus including a process cartridge including an electrophotographic photosensitive member.

Reference numeral 1 denotes a cylindrical electrophotographic photosensitive member, which is rotationally driven around an axis 2 as the center of rotation at a predetermined peripheral velocity in the direction indicated by an arrow. The surface of the electrophotographic photosensitive member 1 is charged to a predetermined positive or negative potential by a charging unit 3. Although the drawing illustrates a roller charging method with a roller charging member, another charging method such as a corona charging method, a proximity charging method and an injection charging method may be employed. The charged surface of the electrophotographic photosensitive member 1 is irradiated with exposure light 4 from an exposure unit (not shown), and an electrostatic latent image corresponding to intended image information is formed. The electrostatic latent image formed on the surface of the electrophotographic photosensitive member 1 is developed with a toner contained in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 bearing the toner image transferred thereon is conveyed to a fixing unit 8, and the toner image is fixed and printed out of the electrophotographic apparatus. The electrophotographic apparatus may include a cleaning unit 9 to remove attached residues such as a residual toner on the surface of the electrophotographic photosensitive member 1 after transfer. Alternatively, what is called cleanerless system may be used, in which such attached residues are removed, for example, with a developing unit, without separately providing a cleaning unit. The electrophotographic apparatus may include a decharging system to decharge the surface of the electrophotographic photosensitive member 1 with pre-exposure light 10 from a pre-exposure unit (not shown). In addition, a guiding unit 12 such as a rail may be provided to attach or detach the process cartridge 11 of the present disclosure to or from the main body of the electrophotographic apparatus.

The electrophotographic photosensitive member of the present disclosure can be used for laser beam printers, LED printers, copiers, facsimile machines and multifunctional peripherals including any of these.

EXAMPLES

Hereinafter, the present disclosure will be described in more detail with reference to Examples and Comparative Examples. The present disclosure is by no means limited to Examples below, unless departing from the spirit of the present disclosure. It should be noted that "part(s)" in the following description of Examples is by mass, unless otherwise specified.

<Production of Electrophotographic Photosensitive Member>

Example 1

An aluminum cylinder (JIS-A3003, aluminum alloy) with a diameter of 24 mm and a length of 257.5 mm was used as a support (electroconductive support).

Subsequently, the following materials were prepared.

Titanium oxide ($TiO_2$) particle (average primary particle diameter: 230 nm) covered with oxygen-deficient tin oxide ($SnO_2$), as metal oxide particle: 214 parts Phenolic resin (monomer/oligomer of phenolic resin) (product name: Plyophen J-325, from Dainippon Ink and Chemicals, Incorporated, resin solid content: 60% by mass), as binder material: 132 parts 1-methoxy-2-propanol, as solvent: 98 parts These materials were put in a sand mill with 450 parts of a glass bead of 0.8 mm in diameter, and dispersed under conditions of rotational frequency: 2000 rpm, dispersion time: 4.5 hours, preset temperature of cooling water: 18° C., to afford a dispersion. From the dispersion, the glass bead was removed with a mesh (mesh size: 150 μm). To the resulting dispersion, a silicone resin particle (product name: Tospearl 120, from Momentive Performance Materials Inc., average particle diameter: 2 μm) as a surface-roughening material was added. The loading of the silicone resin particle was set to reach 10% by mass to the total mass of the metal oxide particle and the binder material in the dispersion after removal of the glass bead. In addition, silicone oil (product name: SH28PA, from Dow Corning Toray Co., Ltd.) as a leveling agent was added to the dispersion to reach 0.01% by mass to the total mass of the metal oxide particle and the binder material in the dispersion. Subsequently, a mixed solvent of methanol and 1-methoxy-2-propanol (mass ratio: 1:1) was added to the dispersion so that the total mass of the metal oxide particle, the binder material and the surface-roughening material in the dispersion (i.e., mass of solid content) reached 67% by mass to the mass of the dispersion. Thereafter, the resultant was stirred to prepare a coating solution for electroconductive layers. The coating solution for electroconductive layers was applied onto the support by dip coating, and heated at 140° C. for 1 hour to form an electroconductive layer of 30 μm in thickness.

Subsequently the following materials were prepared.

Electron transport material represented by formula (E-1) below: 4 parts

Blocked isocyanate (product name: Duranate SBN-70D, from Asahi Kasei Chemicals Corporation): 5.5 parts Polyvinylbutyral resin (S-LEC KS-5Z, from SEKISUI CHEMICAL CO., LTD.): 0.3 parts Zinc (II) hexanoate (from Mitsuwa Chemicals Co., Ltd.), as catalyst: 0.05 parts These materials were dissolved in a mixed solvent of 50 parts of tetrahydrofuran and 50 parts of 1-methoxy-2-propanol to prepare a coating solution for undercoat layers. The coating solution for undercoat layers was applied onto the electroconductive layer by dip coating, and heated at 170° C. for 30 minutes to form an undercoat layer of 0.7 μm in thickness.

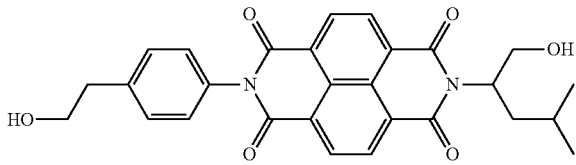

(E-1)

Subsequently, 10 parts of hydroxygallium phthalocyanine with a crystal form having peaks at 7.50 and 28.4° in a chart acquired from CuKα characteristic X-ray diffraction and 5 parts of polyvinylbutyral resin (S-LEC BX-1, from SEKISUI CHEMICAL CO., LTD.) were prepared. These materials were added to 200 parts of cyclohexanone, and dispersed in a sand mill machine with a glass bead of 0.9 mm in diameter for 6 hours. Thereto, 150 parts of cyclohexanone and 350 parts of ethyl acetate were further added for dilution to afford a coating solution for charge generation layers. The resulting coating solution was applied onto the undercoat layer by dip coating, and dried at 95° C. for 10 minutes to form a charge generation layer of 0.20 μm in thickness.

The X-ray diffraction measurement performed was under the following conditions.

[Powder X-Ray Diffraction Measurement]

Measurement apparatus used: from RIGAKU DENKI Company LTD., X-ray diffractometer RINT-TTRII X-ray tube: Cu Tube voltage: 50 KV Tube current: 300 mA Scanning method: 2θ/θ scan Scanning speed: 4.0°/min Sampling interval: 0.02°

Start angle (2θ): 5.0°

Stop angle (2θ): 40.0°

Attachment: standard sample holder

Filter: not used

Incident monochromator: used

Counter monochromator: not used

Divergence slit: open

Divergence vertical limit slit: 10.00 mm

Scatter slit: open

Receiving slit: open

Flat monochromator: used

Counter: scintillation counter

Subsequently, the following materials were prepared.

Charge transport material (hole-transporting material) represented by structural formula (CTM-1) above: 6 parts Charge transport material (hole-transporting material) represented by structural formula (CTM-4) above: 3 parts Charge transport material (hole-transporting material) represented by structural formula (CTM-2) above: 1 part Polycarbonate (product name: Iupilon Z400, from Mitsubishi Engineering-Plastics Corporation): 10 parts Polycarbonate resin including copolymer units represented by structural formulas (C-4) and (C-5) below (x/y=0.95/0.05: viscosity-average molecular weight=20000): 0.02 parts These materials were dissolved in a mixed solvent of 25 parts of ortho-xylene/25 parts of methyl benzoate/25 parts of dimethoxymethane to prepare a coating solution for charge transport layers. The coating solution for charge transport layers was applied onto the charge generation layer by dip coating to form a coating film, and the coating film was dried at 120° C. for 30 minutes to form a charge transport layer of 16 μm in thickness.

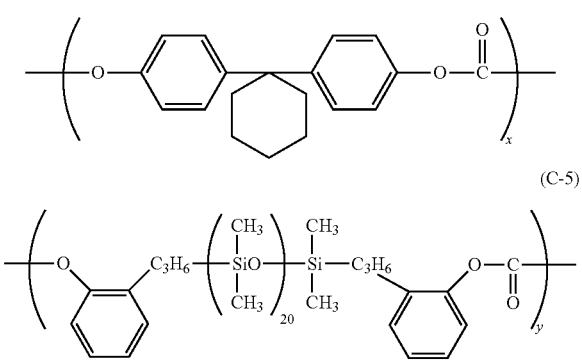

(C-4)

(C-5)

Subsequently, the following materials were prepared.

Compound represented by structural formula (1-1A) below: 19.55 parts

Compound represented by structural formula (2-1A) below: 0.58 parts

Compound represented by structural formula (3-1) above: 1.68 parts

Compound represented by structural formula (4-4A) below: 78.19 parts

Siloxane-modified acrylic compound (SYMAC US270, from TOAGOSEI CO., LTD.): 0.1 parts

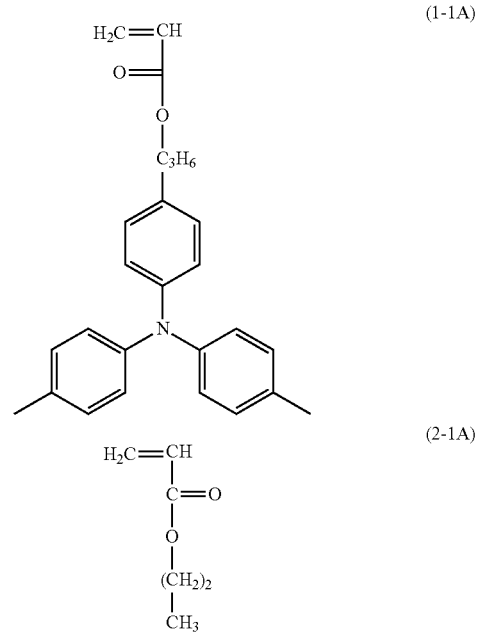

(1-1A)

(2-1A)

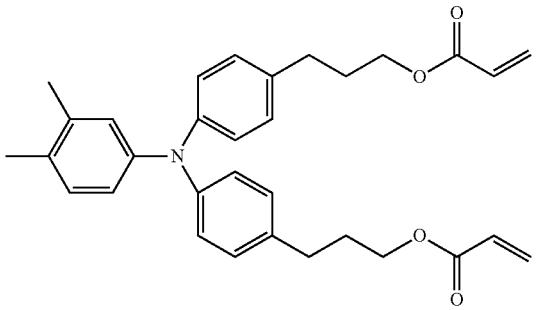

(4-4A)

These materials were mixed with 175 parts of cyclohexane and 75 parts of 1-propanol and stirred. In this way, a coating solution for protective layers was prepared.

This coating solution for protective layers was applied onto the charge transport layer by dip coating to form a coating film, and the resulting coating film was dried at 50° C. for 6 minutes. Thereafter, the coating film was irradiated with an electron beam in a nitrogen atmosphere under conditions of acceleration voltage: 70 kV and beam current: 5.0 mA for 1.6 seconds, while the support (object to be irradiated) was rotated at a speed of 300 rpm. The dose at the uppermost layer was 15 kGy. Then, the temperature was elevated from 25° C. to 117° C. in a nitrogen atmosphere over 20 seconds to heat the coating film. The oxygen concentration during the electron beam irradiation and the subsequent heating was 10 ppm or less. Subsequently, the coating film was naturally cooled to a temperature of 25° C. in the atmosphere, and heated under conditions such that the temperature of the coating film reached 105° C. for 30 minutes to form a protective layer of 3 μm in thickness. In this way, a cylindrical (drum-shaped) electrophotographic photosensitive member of Example 1, including the protective layer, was produced.

Examples 2 to 13

Electrophotographic photosensitive members were produced in the same manner as in Example 1 except that the quantities of the compounds in Example 1 were changed as listed in Table 1.

Example 14

An electrophotographic photosensitive member was produced in the same manner as in Example 1 except that the quantities and types of the compounds in Example 1 were changed as listed in Table 1. The following illustrates a structural formula (2-3A).

(2-3A)

Example 15

An electrophotographic photosensitive member was produced in the same manner as in Example 1 except that the quantities and types of the compounds in Example 1 were changed as listed in Table 1, and that 175 parts of cyclohexane and 75 parts of 1-propanol were replaced with 250 parts of tetrahydrofuran. The following illustrates structural formulas (1-6A) and (4-1A).

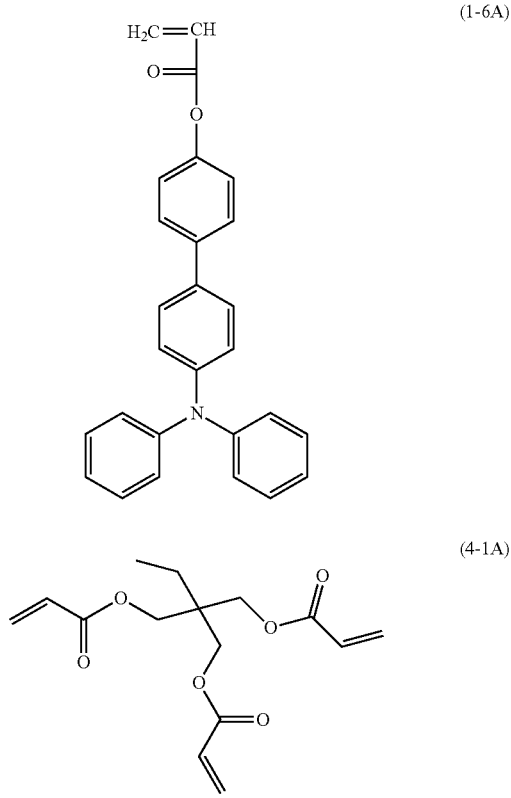

Example 16

An electrophotographic photosensitive member was produced in the same manner as in Example 1 except that the quantities and types of the compounds in Example 1 were changed as listed in Table 1. The following illustrates a structural formula (4-2A).

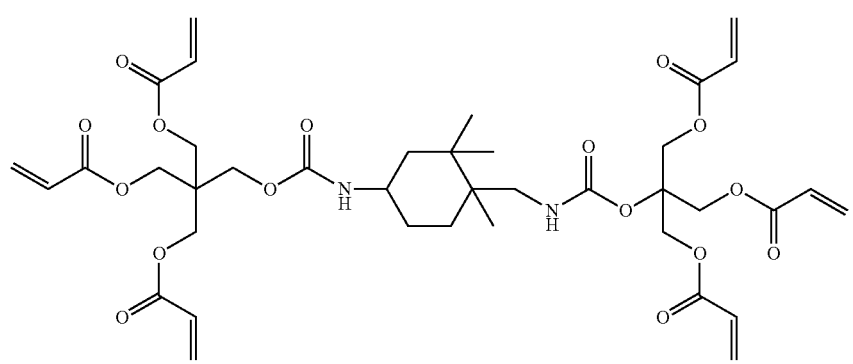

Example 17

An electrophotographic photosensitive member was produced in the same manner as in Example 1 except that the quantities and types of the compounds in Example 1 were changed as listed in Table 1. The following illustrates a structural formula (4-3A).

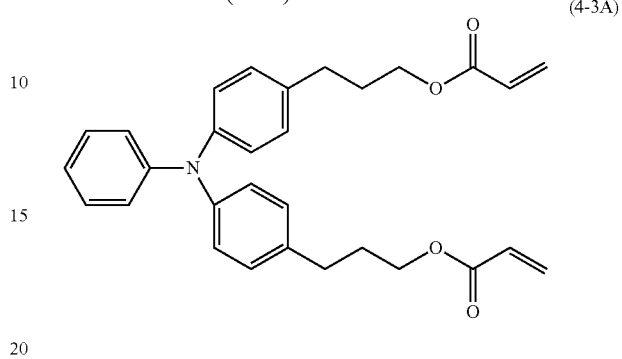

Example 18

An electrophotographic photosensitive member was produced in the same manner as in Example 1 except that the quantities and types of the compounds in Example 1 were changed as listed in Table 1.

Example 19

An electrophotographic photosensitive member was produced in the same manner as in Example 1 except that the quantities and types of the compounds in Example 1 were changed as listed in Table 1. The following illustrates a structural formula (1-2A).

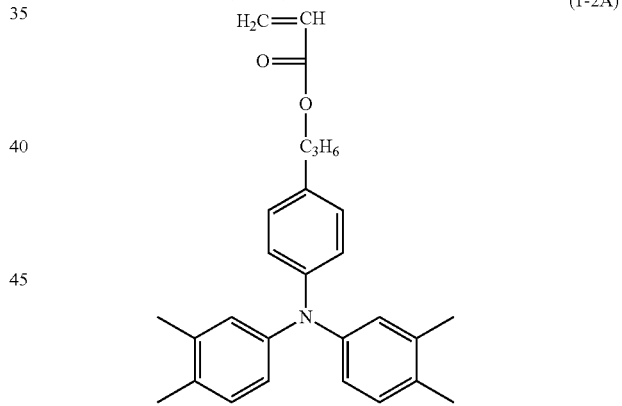

29
Example 20

An electrophotographic photosensitive member was produced in the same manner as in Example 1 except that the quantities and types of the compounds in Example 1 were changed as listed in Table 1. The following illustrates a structural formula (1-7A).

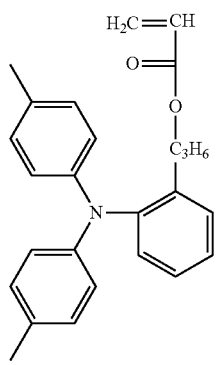

(1-7A)

Example 21

An electrophotographic photosensitive member was produced in the same manner as in Example 1 except that the quantities and types of the compounds in Example 1 were changed as listed in Table 1. The following illustrates structural formulas (1-5A) and (4-5A).

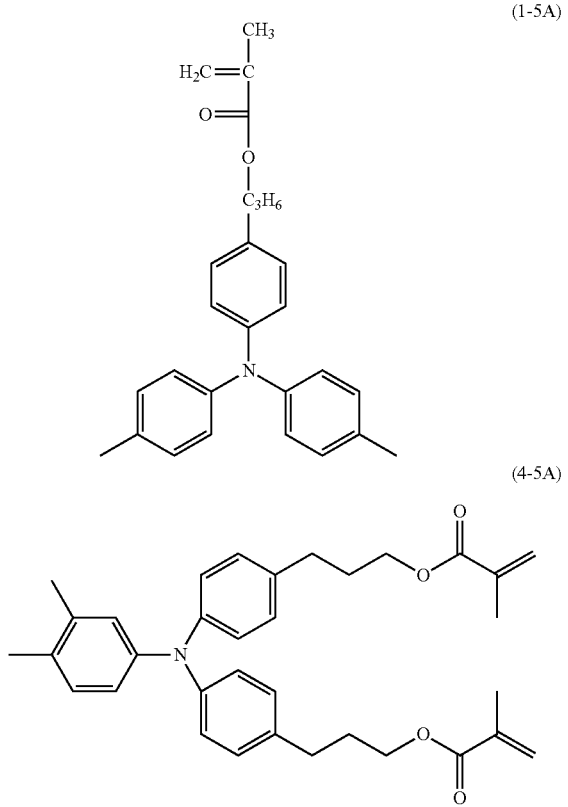

(1-5A)

(4-5A)

30
Examples 22, 23

Electrophotographic photosensitive members were produced in the same manner as in Example 1 except that the quantities and types of the compounds in Example 1 were changed as listed in Table 1.

Example 24

An electrophotographic photosensitive member was produced in the same manner as in Example 1 except that the quantities and types of the compounds in Example 1 were changed as listed in Table 1. The following illustrates a structural formula (2-2A).

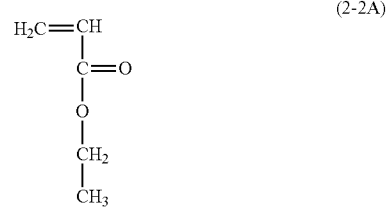

(2-2A)

Example 25

An electrophotographic photosensitive member was produced in the same manner as in Example 1 except that the quantities and types of the compounds in Example 1 were changed as listed in Table 1. The following illustrates a structural formula (1-3A).

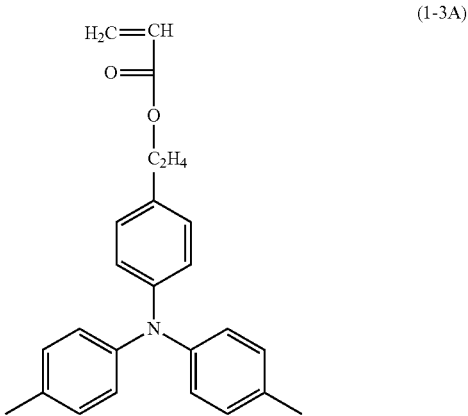

(1-3A)

Example 26

An electrophotographic photosensitive member was produced in the same manner as in Example 1 except that the quantities and types of the compounds in Example 1 were changed as listed in Table 1. The following illustrates a structural formula (1-4A).

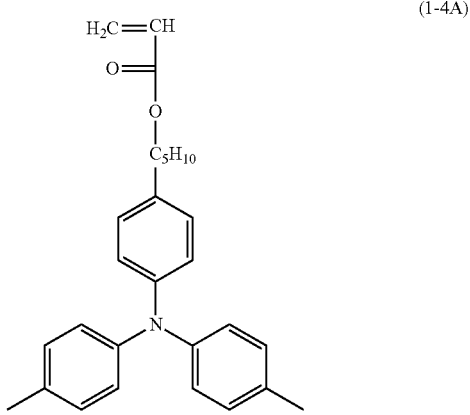

Comparative Example 1

An electrophotographic photosensitive member was produced in the same manner as in Example 1 except that the quantities and types of the compounds in Example 1 were changed as listed in Table 1. The following illustrates a structural formula (4-6A).

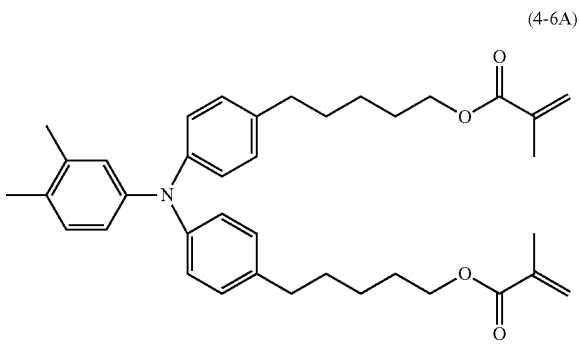 [SMILES: C=C(C)C(=O)OCCCCCc1ccc(N(c2ccc(CCCCCOC(=O)C(=C)C)cc2)c2ccc(C)c(C)c2)cc1]

Comparative Examples 2 to 4

Electrophotographic photosensitive members were produced in the same manner as in Example 1 except that the quantities and types of the compounds in Example 1 were changed as listed in Table 1.

Comparative Examples 5, 6

Electrophotographic photosensitive members were produced in the same manner as in Example 1 except that the quantities and types of the compounds in Example 1 were changed as listed in Table 1, and that 175 parts of cyclohexane and 75 parts of 1-propanol were replaced with 250 parts of tetrahydrofuran.

<Analysis>

Each of the photosensitive members produced in Examples 1 to 26 and the photosensitive members produced in Comparative Examples 1 to 6 was analyzed for the configuration of the protective layer under the following conditions.

The surface of each of the electrophotographic photosensitive members obtained was scraped off with a razor to give the protective layer. The protective layer was subjected to $^1$H-NMR analysis (apparatus: from Bruker, AVANCEIII 500) and pyrolysis gas chromatography to determine the molar ratio among the structural formula (1), the structural formula (2) and the structural formula (3) in the protective layer.

The results are shown in Table 2.

<Evaluation>

Each of the photosensitive members produced in Examples 1 to 26 and the photosensitive members produced in Comparative Examples 1 to 6 was evaluated for potential variation under the following conditions.

A laser beam printer from Hewlett-Packard Company, product name: HP LaserJet Enterprise Color M553dn, was customized and the customized machine was used as an electrophotographic apparatus. The customization carried out enabled control and measurement of voltage applied to the charging roller and control and measurement of the amount of exposure light for an image.

First, the image-forming apparatus and the photosensitive members were left to stand in an environment with a temperature of 15° C. and a humidity of 10% RH for 24 hours or longer, and thereafter each of the photosensitive members of Examples 1 to 26 and Comparative Examples 1 to 6 was installed in a cartridge of cyan color for the image-forming apparatus.

For evaluation in terms of repeated use, an image of a test chart with a coverage rate of 5% was continuously output on 20000 A4-sized normal paper sheets. The dark potential was adjusted to −600 V for charging, and the amount of exposure light for an image was adjusted to 0.4 μJ/cm$^2$ for exposure.

The amount of variation of light potential was evaluated before and after the repeated use. For measurement of surface potential of the photosensitive members, the cartridge was customized to install a potential probe (product name: model 6000B-8, from TREK JAPAN) at a position for development. Potential was measured by using a surface potential meter (product name: model 344, from TREK JAPAN).

The evaluation results obtained for potential variation (V) are shown in Table 2. Each of The photosensitive members produced in Examples 1 to 26 gave a small value of potential variation, and thus was found to have high potential variation-suppressing effect.

TABLE 1

|  | Structure (1) | Structure (2) | Structure (3) | Structure (4) | Structure (1) part by mass | Structure (2) part by mass | Structure (3) part by mass | Structure (4) part by mass |
| --- | --- | --- | --- | --- | --- | --- | --- | --- |
| Example 1 | (1-1A) | (2-1A) | (3-1) | (4-4A) | 19.55 | 0.58 | 1.68 | 78.19 |
| Example 2 | (1-1A) | (2-1A) | (3-1) | (4-4A) | 19.57 | 0.48 | 1.68 | 78.27 |
| Example 3 | (1-1A) | (2-1A) | (3-1) | (4-4A) | 29.19 | 0.69 | 2.01 | 68.11 |
| Example 4 | (1-1A) | (2-1A) | (3-1) | (4-4A) | 29.29 | 0.61 | 1.76 | 68.34 |
| Example 5 | (1-1A) | (2-1A) | (3-1) | (4-4A) | 29.36 | 0.55 | 1.59 | 68.50 |

TABLE 1-continued

|  | Structure (1) | Structure (2) | Structure (3) | Structure (4) | Structure (1) part by mass | Structure (2) part by mass | Structure (3) part by mass | Structure (4) part by mass |
|---|---|---|---|---|---|---|---|---|
| Example 6 | (1-1A) | (2-1A) | (3-1) | (4-4A) | 29.39 | 0.52 | 1.52 | 68.57 |
| Example 7 | (1-1A) | (2-1A) | (3-1) | (4-4A) | 59.60 | 0.16 | 0.51 | 39.73 |
| Example 8 | (1-1A) | (2-1A) | (3-1) | (4-4A) | 49.68 | 0.22 | 0.43 | 49.68 |
| Example 9 | (1-1A) | (2-1A) | (3-1) | (4-4A) | 59.74 | 0.18 | 0.26 | 39.83 |
| Example 10 | (1-1A) | (2-1A) | (3-1) | (4-4A) | 39.72 | 0.35 | 0.34 | 59.58 |
| Example 11 | (1-1A) | (2-1A) | (3-1) | (4-4A) | 69.99 | 0.004 | 0.012 | 30.00 |
| Example 12 | (1-1A) | (2-1A) | (3-1) | (4-4A) | 29.88 | 0.27 | 0.13 | 69.72 |
| Example 13 | (1-1A) | (2-1A) | (3-1) | (4-4A) | 29.47 | 0.26 | 1.52 | 68.75 |
| Example 14 | (1-1A) | (2-3A) | (3-1) | (4-4A) | 59.78 | 0.11 | 0.26 | 39.85 |
| Example 15 | (1-6A) | (2-1A) | (3-5) | (4-1A) | 39.79 | 0.17 | 0.34 | 59.69 |
| Example 16 | (1-1A) | (2-1A) | (3-1) | (4-2A) | 39.79 | 0.18 | 0.34 | 59.69 |
| Example 17 | (1-1A) | (2-1A) | (3-1) | (4-2A) (4-3A) | 39.79 | 0.18 | 0.34 | 29.84 29.84 |
| Example 18 | (1-1A) | (2-1A) | (3-1) | (4-3A) | 39.79 | 0.18 | 0.34 | 59.69 |
| Example 19 | (1-2A) | (2-1A) | (3-2) | (4-4A) | 39.78 | 0.16 | 0.38 | 59.67 |
| Example 20 | (1-7A) | (2-1A) | (3-6) | (4-4A) | 39.79 | 0.18 | 0.34 | 59.69 |
| Example 21 | (1-5A) | (2-1A) | (3-2) | (4-5A) | 39.79 | 0.17 | 0.36 | 59.68 |
| Example 22 | (1-1A) | (2-1A) | (3-1) | (4-4A) | 39.88 | 0.12 | 0.17 | 59.83 |
| Example 23 | (1-1A) | (2-1A) | (3-1) | (4-4A) | 39.88 | 0.12 | 0.17 | 59.83 |
| Example 24 | (1-1A) | (2-2A) | (3-1) | (4-4A) | 39.80 | 0.16 | 0.34 | 59.70 |
| Example 25 | (1-3A) | (2-1A) | (3-3) | (4-4A) | 39.79 | 0.18 | 0.34 | 59.69 |
| Example 26 | (1-4A) | (2-1A) | (3-4) | (4-4A) | 39.80 | 0.16 | 0.35 | 59.69 |
| Comparative Example 1 | (1-3A) | — | (3-3) | (4-6A) | 47.95 | 0.00 | 4.10 | 47.95 |
| Comparative Example 2 | (1-3A) | — | (3-3) | (4-6A) | 44.32 | 0.00 | 11.36 | 44.32 |
| Comparative Example 3 | (1-3A) | (2-1A) | — | (4-6A) | 49.24 | 1.51 | 0.00 | 49.24 |
| Comparative Example 4 | (1-3A) | (2-1A) | — | (4-6A) | 47.80 | 4.41 | 0.00 | 47.80 |
| Comparative Example 5 | (1-6A) | (2-1A) | (3-5) | (4-1A) | 46.19 | 4.04 | 3.58 | 46.19 |
| Comparative Example 6 | (1-6A) | (2-1A) | (3-5) | (4-1A) | 43.77 | 1.15 | 11.32 | 43.77 |

TABLE 2

|  | Structure (1) | Structure (2) | Structure (3) | Molar ratio of structure (2) to structure (1) | Molar ratio of structure (3) to structure (1) | Molar ratio of structure (2) to structure (3) | Potential variation [V] |
|---|---|---|---|---|---|---|---|
| Example 1 | (1-1) | (2-1) | (3-1) | 0.1000 | 0.1000 | 1.00 | 27 |
| Example 2 | (1-1) | (2-1) | (3-1) | 0.0830 | 0.1000 | 0.83 | 30 |
| Example 3 | (1-1) | (2-1) | (3-1) | 0.0800 | 0.0800 | 1.00 | 24 |
| Example 4 | (1-1) | (2-1) | (3-1) | 0.0700 | 0.0700 | 1.00 | 24 |
| Example 5 | (1-1) | (2-1) | (3-1) | 0.0630 | 0.0630 | 1.00 | 24 |
| Example 6 | (1-1) | (2-1) | (3-1) | 0.0600 | 0.0600 | 1.00 | 19 |
| Example 7 | (1-1) | (2-1) | (3-1) | 0.0090 | 0.0100 | 0.90 | 19 |
| Example 8 | (1-1) | (2-1) | (3-1) | 0.0150 | 0.0100 | 1.50 | 17 |
| Example 9 | (1-1) | (2-1) | (3-1) | 0.0100 | 0.0050 | 2.00 | 17 |
| Example 10 | (1-1) | (2-1) | (3-1) | 0.0300 | 0.0100 | 3.00 | 17 |
| Example 11 | (1-1) | (2-1) | (3-1) | 0.0002 | 0.0002 | 1.00 | 19 |
| Example 12 | (1-1) | (2-1) | (3-1) | 0.0300 | 0.0050 | 6.00 | 23 |
| Example 13 | (1-1) | (2-1) | (3-1) | 0.0300 | 0.0600 | 0.50 | 23 |
| Example 14 | (1-1) | (2-3) | (3-1) | 0.0100 | 0.0050 | 2.00 | 14 |
| Example 15 | (1-6) | (2-1) | (3-5) | 0.0150 | 0.0100 | 1.50 | 23 |
| Example 16 | (1-1) | (2-1) | (3-1) | 0.0150 | 0.0100 | 1.50 | 23 |
| Example 17 | (1-1) | (2-1) | (3-1) | 0.0150 | 0.0100 | 1.50 | 22 |
| Example 18 | (1-1) | (2-1) | (3-1) | 0.0150 | 0.0100 | 1.50 | 19 |
| Example 19 | (1-2) | (2-1) | (3-2) | 0.0150 | 0.0100 | 1.50 | 17 |
| Example 20 | (1-7) | (2-1) | (3-6) | 0.0150 | 0.0100 | 1.50 | 17 |
| Example 21 | (1-5) | (2-1) | (3-2) | 0.0150 | 0.0100 | 1.50 | 17 |
| Example 22 | (1-1) | (2-1) | (3-1) | 0.0100 | 0.0050 | 2.00 | 18 |
| Example 23 | (1-1) | (2-1) | (3-1) | 0.0100 | 0.0050 | 2.00 | 17 |
| Example 24 | (1-1) | (2-2) | (3-1) | 0.0150 | 0.0100 | 1.50 | 17 |
| Example 25 | (1-3) | (2-1) | (3-3) | 0.0150 | 0.0100 | 1.50 | 17 |
| Example 26 | (1-4) | (2-1) | (3-4) | 0.0150 | 0.0100 | 1.50 | 18 |
| Comparative Example 1 | (1-3) | — | (3-3) | — | 0.1000 | — | 65 |
| Comparative Example 2 | (1-3) | — | (3-3) | — | 0.3000 | — | 63 |
| Comparative Example 3 | (1-3) | (2-1) | — | 0.1000 | — | — | 53 |
| Comparative Example 4 | (1-3) | (2-1) | — | 0.3000 | — | — | 55 |
| Comparative Example 5 | (1-6) | (2-1) | (3-5) | 0.3000 | 0.0900 | 3.33 | 50 |
| Comparative Example 6 | (1-6) | (2-1) | (3-5) | 0.0900 | 0.3000 | 0.30 | 59 |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-105591, filed May 31, 2018, which is hereby incorporated by reference herein in its entirety.

What is claimed is:

1. An electrophotographic photosensitive member comprising a support, a photosensitive layer and a protective layer in this order, wherein the protective layer comprises:

a resin comprising a structure represented by a general formula (1) and a structure represented by a general formula (2); and a compound represented by a general formula (3), the molar ratio of the proportion of the structure represented by the general formula (2) to the proportion of the structure represented by the general formula (1) in the resin is 0.0002 or more and 0.1000 or less, and the molar ratio of the content of the compound represented by the general formula (3) to the content of the structure represented by the general formula (1) in the resin in the protective layer is 0.0002 or more and 0.1000 or less:

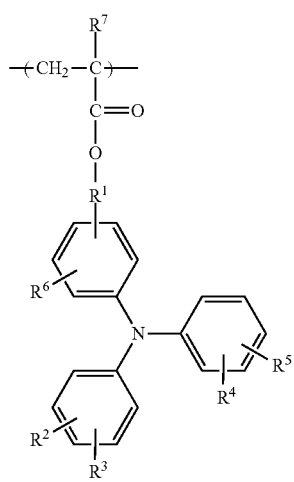

wherein $R^1$ is a substituted or unsubstituted alkylene group or a substituted or unsubstituted phenylene group; and $R^2$ to $R^7$ are each independently a hydrogen atom, a methyl group or an ethyl group,

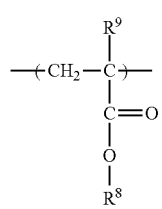

wherein $R^8$ is a hydrogen atom or a substituted or unsubstituted alkyl group having one to three carbon atoms; and $R^9$ is a hydrogen atom, a methyl group or an ethyl group,

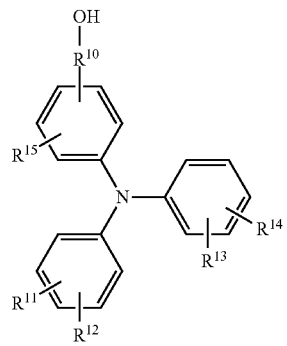

wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.

2. The electrophotographic photosensitive member according to claim 1, wherein the molar ratio of the proportion of the structure represented by the general formula (2) to the proportion of the structure represented by the general formula (1) in the resin is 0.0002 or more and 0.0800 or less, and the molar ratio of the content of the compound represented by the general formula (3) to the content of the structure represented by the general formula (1) in the resin in the protective layer is 0.0002 or more and 0.0800 or less.

3. The electrophotographic photosensitive member according to claim 1, wherein the molar ratio of the proportion of the structure represented by the general formula (2) to the proportion of the structure represented by the general formula (1) in the resin is 0.0002 or more and 0.0600 or less, and the molar ratio of the content of the compound represented by the general formula (3) to the content of the structure represented by the general formula (1) in the resin in the protective layer is 0.0002 or more and 0.0600 or less in a molar ratio.

4. The electrophotographic photosensitive member according to claim 1, wherein the molar ratio of the content of the structure represented by the general formula (2) in the resin to the content of the compound represented by the general formula (3) in the protective layer is 0.9 or more and 3.0 or less.

5. The electrophotographic photosensitive member according to claim 1, wherein the resin comprised in the protective layer further comprises a structure represented by a general formula (4):

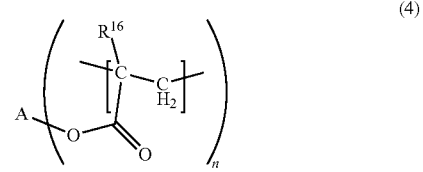

wherein A is an organic group; $R^{16}$ is a hydrogen atom, a methyl group or an ethyl group; and n is an integer of 2 or more and 6 or less.

6. The electrophotographic photosensitive member according to claim 5, wherein the structure represented by the general formula (4) is a structure represented by the following general formula (5):

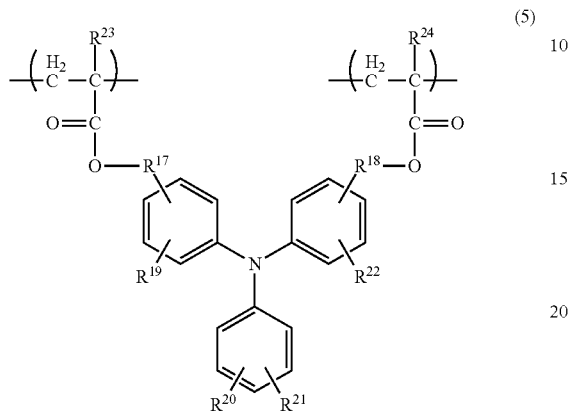

wherein $R^{17}$ and $R^{18}$ are each independently a substituted or unsubstituted alkylene group; and $R^{19}$ to $R^{24}$ are each independently a hydrogen atom or a methyl group.

7. The electrophotographic photosensitive member according to claim 1, wherein $R^1$ in the general formula (1) and $R^{10}$ in the general formula (3) are each an alkylene group having two or more and five or less carbon atoms.

8. The electrophotographic photosensitive member according to claim 1, wherein $R^8$ in the general formula (2) is a hydrogen atom.

9. A process cartridge attachable to and detachable from a main body of an electrophotographic apparatus, the process cartridge comprising and integrally supporting:

an electrophotographic photosensitive member comprising a support, a photosensitive layer and a protective layer in this order; and at least one unit selected from the group consisting of a charging unit, a developing unit and a cleaning unit, wherein the protective layer comprises:

a resin comprising a structure represented by a general formula (1) and a structure represented by a general formula (2); and a compound represented by a general formula (3), the molar ratio of the proportion of the structure represented by the general formula (2) to the proportion of the structure represented by the general formula (1) in the resin is 0.0002 or more and 0.1000 or less, and the molar ratio of the content of the compound represented by the general formula (3) to the content of the structure represented by the general formula (1) in the resin in the protective layer is 0.0002 or more and 0.1000 or less in a molar ratio:

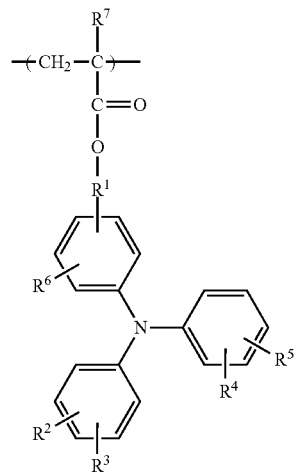

wherein $R^1$ is a substituted or unsubstituted alkylene group or a substituted or unsubstituted phenylene group; and $R^2$ to $R^7$ are each independently a hydrogen atom, a methyl group or an ethyl group,

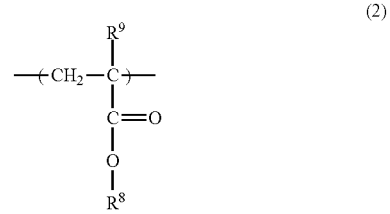

wherein $R^8$ is a hydrogen atom or a substituted or unsubstituted alkyl group having one to three carbon atoms; and $R^9$ is a hydrogen atom, a methyl group or an ethyl group,

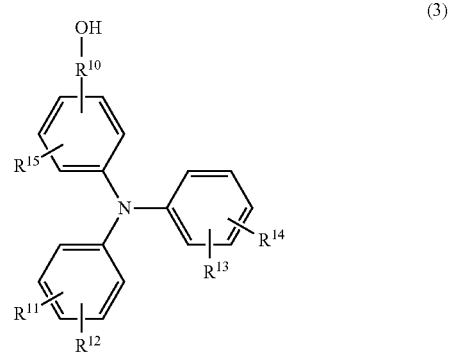

wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.

10. An electrophotographic apparatus comprising: an electrophotographic photosensitive member comprising a support, a photosensitive layer and a protective layer in this order; a charging unit; an exposure unit; a developing unit; and a transferring unit, wherein the protective layer comprises:

a resin comprising a structure represented by a general formula (1) and a structure represented by a general formula (2); and a compound represented by a general formula (3), the molar ratio of the proportion of the structure represented by the general formula (2) to the proportion of the structure represented by the general formula (1) in the resin is 0.0002 or more and 0.1000 or less, and the molar ratio of the content of the compound represented by the general formula (3) to the content of the structure represented by the general formula (1) in the resin in the protective layer is 0.0002 or more and 0.1000 or less:

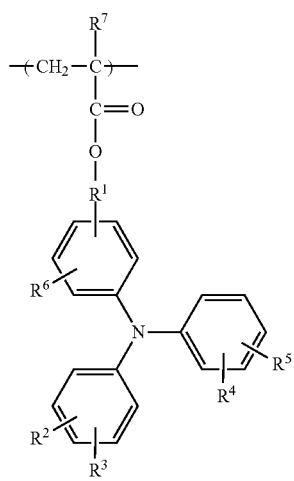

(1)

wherein $R^1$ is a substituted or unsubstituted alkylene group or a substituted or unsubstituted phenylene group; and $R^2$ to $R^7$ are each independently a hydrogen atom, a methyl group or an ethyl group,

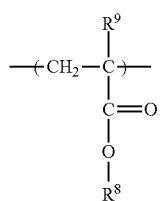

(2)

wherein $R^8$ is a hydrogen atom or a substituted or unsubstituted alkyl group having one to three carbon atoms; and $R^9$ is a hydrogen atom, a methyl group or an ethyl group,

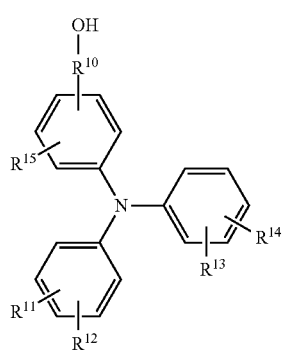

(3)

wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.

11. An electrophotographic photosensitive member comprising:

a photosensitive layer and a protective layer in this order above a support, wherein the protective layer is a film obtained by curing a coating solution for protective layers, the coating solution for protective layers comprises: a solvent; a resin comprising a structure represented by a general formula (1-A) below and a structure represented by a general formula (2-A) below; and a compound represented by a general formula (3) below, the molar ratio of the proportion of the structure represented by the general formula (2-A) to the proportion of the structure represented by the general formula (1-A) in the resin is 0.0002 or more and 0.1000 or less, and the molar ratio of the content of the compound represented by the general formula (3) to the content of the structure represented by the general formula (1-A) in the resin in the protective layer is 0.0002 or more and 0.1000 or less:

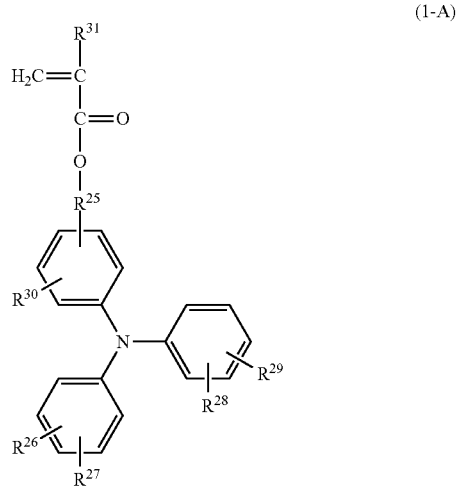

(1-A)

wherein $R^{25}$ is a substituted or unsubstituted alkylene group or a substituted or unsubstituted phenylene group; and $R^{26}$ to $R^{31}$ are each independently a hydrogen atom, a methyl group or an ethyl group,

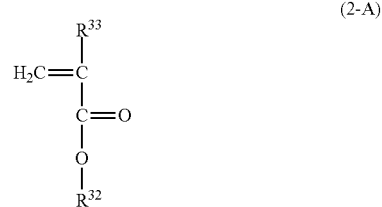

(2-A)

wherein $R^{32}$ is a hydrogen atom or a substituted or unsubstituted alkyl group having one to three carbon atoms; and $R^{33}$ is a hydrogen atom, a methyl group or an ethyl group,

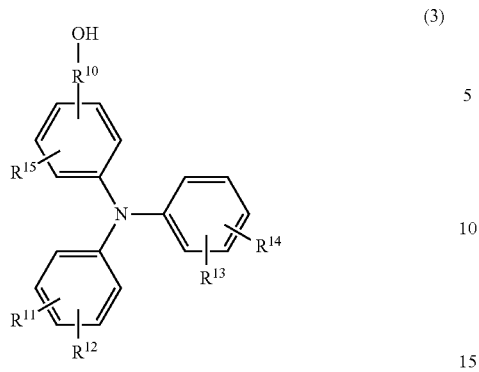
(3)
wherein $R^{10}$ is a substituted or unsubstituted alkylene group or a substituted or unsubstituted phenylene group; and $R^{11}$ to $R^{15}$ are each independently a hydrogen atom, a methyl group or an ethyl group.
* * * * *